United States Patent Office 3,591,696
Patented July 6, 1971

3,591,696
METHOD OF TREATING JAUNDICE IN ANIMALS
Allan H. Conney, Westchester, and John J. Burns, New York, N.Y., assignors to Burroughs Wellcome Co., Tuckahoe, N.Y.
No Drawing. Original application June 15, 1966, Ser. No. 557,606. Divided and this application Nov. 6, 1969, Ser. No. 871,259
Int. Cl. A61k 27/00
U.S. Cl. 424—254         4 Claims

ABSTRACT OF THE DISCLOSURE

A method of treating an animal suffering from jaundice which comprises administering to the animal a pharmacologically effective jaundice treatment amount of a compound 1-phenyl-5,5-diethyl barbituric acid.

---

This application is a division of U.S. application Ser. No. 557,606, filed June 15, 1966, now abandoned.

This invention relates to methods of treating and prophylaxes for various ailments and more particularly relates to methods for stimulating enzymatic oxidations.

It is well known that a major process, by which drugs and other substances are eliminated from or modified in the body is through oxidation. While a number of oxidative processes exist, the specific concern of the instant invention is hydroxylation carried out by enzymes located particularly in the microsomes of body cells and notably in liver cells. The oxidations with which these enzymes are especially concerned are hydroxylations, that is, replacement of a hydrogen bound to carbon by a hydroxyl group. Thus, for example, a phenyl group may be hydroxylated, usually para to the main atachment, to become p-hydroxyphenyl.

Still another type of hydroxylation takes place with steroid compounds which may be hydroxylated in various places, the 6-position especially. This often results in conversion to steroids which are relatively inert physiologically. It is believed that enhanced oxidative ability produced by the treatment of this invention is due to the activation of the process in the body for forming oxidative enzymes. This has been verified in tests made on newborn animals, where oxidative ability is virtually absent before treatment. In such cases new oxidative enzymes must have been made as a result of the treatment.

The teachings of this invention may be applied to the treatment of newborn infants or other individuals, that are afflicted with jaundice due to a low excretion rate of bilirubin. This excretion of bilirubin is preceded by conjugation to a glucuronide involving oxidative processes.

Applicants have discovered that Phetharbital, formerly known by other names such as 1-phenyl-5,5-diethyl barbituric acid, 1-phenyl barbital, or pyrictal, which has previously been used in the treatment of febrile convulsions of children (see U.S. Pat. 2,955,073) may be used to produce increased enzymatic activity which will lead to the hydroxylation of steroids. Applicants have discovered that the above-mentioned ailment may be treated by the administration of such drug. Phetharbital is physiologically rather inert as a drug and, accordingly, has a low degree of toxicity. It is itself oxidized fairly rapidly and is execreted preponderantly as N-p-hydroxyphenyl barbital. Doses of up to 600 mg. intravenously have been given to human volunteers with no side effects observable beyond mild sedation. Oral doses of 1 gram were well tolerated. Rats have been given as much as 5 grams/kg./day, in diet, during chronic toxicity studies, without serious injury. Animals receiving 2.5 grams/kg./day were normal in all observations.

Patients, such as man or animal, treated for the above-mentioned ailment or to produce increased enzymatic activity, would be given dosages ranging from about 1 mg./kg. (body weight)/day, to about 40 mg./kg.(body weight)/day, the preferable dosage being between 5–20 mg./kg./day. The drug may be administered intravenously or, preferably, orally. Extensive studies have shown that phetharbital is a strong enzyme inducer and stimulates a variety of oxidations.

In Table I there is shown the effect of pretreatment with phetharbital on the microsomal oxidation of cortisol in guinea pigs. The microsome-suspensions were made by the method described by Conney et al., in "Journal of Pharmacology and Experimental Therapeutics," (30, 1, 1960).

Table II included herein demonstrates increased metabolism of hexobarbital and zoxazolamine. Table III shows increased metabolism of diphenyl hydantoin, Table IV illustrates the effect of the administration of pyrictal on phenylbutazone.

Accordingly, the substance of the present invention relies on the method of treating and stimulating enzymatic oxidative processes in vivo for a therapeutic purpose, one of which has been exemplified above.

TABLE I

Increased Activity of Cortisol 6β-Hydroxylase in Liver Microsomes of Guinea Pigs Treated With Phetharbital and Other Drugs

| Experiment | Treatment | Daily dose (mg./kg.) | 6β-hydroxycortisol formed (mμmoles ± S.D.) |
|---|---|---|---|
| 1 | Control | | 1.03±.28 |
|   | Phetharbital | 75 | 2.32±.57 |
|   | Phenobarbital | 60 | 1.95±.40 |
| 2 | Control | | 1.79±0.37 |
|   | Diphenylhydantoin | 100 | 4.28±0.30 |
|   | Phenobarbital | 75 | 3.06±0.21 |
| 3 | Control | | 1.50±0.67 |
|   | Diphenylhydantoin | 50 | 3.64±0.69 |
|   | Phenobarbital | 75 | 5.67±2.30 |

Female Hartley guinea pigs were injected intraperitoneally twice daily for 10 days in experiments 1 and 2, and for 4 days in experiment 3. Liver microsomes from 660 mg. of liver were incubated for 30 minutes at 37° with 100 mμ moles of cortisol-4-C$^{14}$ in the presence of a system that generates reduced triphosphopyridine nucleotide.

TABLE II

Effect of Phetharbital and Phenobarbital On the Duration of Action of Hexobarbital and Zoxazolamine

| Pretreatment | Duration of hexobarbital sleep (minutes) | Duration of zoxazolamine paralysis (minutes) |
|---|---|---|
| Control | 167±14 | 336±55 |
| Phetharbital | 27±4 | 86±7 |
| Phenobarbital | 4±1 | 79±10 |

Male rats weighing 45 g. were injected i.p. twice daily with 37 mg./kg. of barbiturate for 4 days. On the fifth day they received a single i.p. injection of 100 mg./kg. of hexobarbital or 75 mg./kg. of zoxazolamine. Each value represents the average and standard error obtained from 10 rats.

Stimulatory effect of phetharbital on diphenylhydantoin metabolism in dogs

Diphenylhydantoin was administered intravenously to dogs in a dose of 50 mg./kg. and plasma levels of the drug were determined at various times over the following 6 hours. The dogs were given phenobarbital or phetharbital orally for 16 to 70 days, and plasma levels of diphenylhydantoin were again determined after an intravenous dose of the drug. The results in Table III show that chronic treatment with the barbiturates stimulated markedly the metabolism of diphenylhydantoin. The half-life of diphenylhydantoin in control dogs averaged 7.3 hours, whereas the half-life of diphenylhydantoin in dogs pretreated with phetharbital or phenobarbital was 2.3 and 2.1 hours, respectively. In accord with these results, the plasma levels of diphenylhydantoin in drug-treated dogs at 6 hours after diphenylhydantoin were about one-fifth of those found before pretreatment with the enzyme stimulators. The dogs treated chronically with phetharbital failed to show the sedation observed in the phenobarbital treated animals.

TABLE III

Stimulatory Effect of phetharbital and phenobarbital on diphenylhydantoin (DPH) metabolism in dogs

| Dog No. | Sex | Drug treatment | Daily dosage [1] (mg./kg.) | Duration of dosage (days) | Before treatment Half-life of DPH [2] (hours) | Before treatment Plasma level of DPH at 6 hours (mg./l.) | After treatment Half-life of DPH (hours) | After treatment Plasma level of DPH at 6 hours (mg./l.) |
|---|---|---|---|---|---|---|---|---|
| 1 | M | Phenobarbital | 16 | 70 | 5.5 | 19 | 2.5 | 6.8 |
| 2 | F | do | 16 | 30 | 7.1 | 25 | 2.0 | 5.0 |
| 3 | F | do | 16 | 30 | 6.5 | 23 | 1.5 | 1.0 |
| 4 | M | do | 16 | 70 | 12.4 | 25 | 2.3 | 4.2 |
| 5 | F | Phetharbital | 100 | 43 | 7.8 | 29 | 2.0 | 5.0 |
| 6 | F | do | 60 | 16 | 6.0 | 28 | 2.5 | 10.0 |
| 7 | M | do | 100 | 65 | 5.8 | 22 | 2.4 | 7.2 |
| 8 | F | None | | | 8.8 | 22 | | |
| 9 | F | do | | | 6.0 | 25 | | |

[1] Drugs were given orally in divided doses twice daily.
[2] Diphenylhydantoin (50 mg./kg.) was given intravenously to all dogs except number 4, which received the drug intraperitoneally.

Stimulatory effect of phetharbital on phenylbutazone metabolism in dogs

Phenylbutazone is metabolized slowly in the dog, and a plasma level of about 64 mg./liter is obtained at 7 hours after a 25 mg./kg. i.p. dose. However, the drug was metabolized much more rapidly when dogs were pretreated with phetharbital or phenobarbital. Under these conditions, the plasma level of phenylbutazone at 7 hours averaged only 15 and 19 mg./l., respectively (Table IV).

TABLE IV

Effect of Phetharbital and Phenobarbital On Phenylbutazone Plasma Level

| Pretreatment [1] | Daily oral dosage (mg./kg.) | No. of dogs | Plasma phenylbutazone [2] level 7 hrs. after 25 mg./kg. i.p. (mg./l.) |
|---|---|---|---|
| None | | 6 | 64.0±4.7 |
| Phetharbital | 100 | 3 | 14.6±2.2 |
| Phenobarbital | 16 | 4 | 9.9±1.5 |

[1] Drugs were given for 1-4 months.
[2] Phenylbutazone was given i.p. as a 1.25% solution of the sodium salt

What is claimed is:

1. The method of treating an animal suffering from jaundice which comprises administering a pharmacologically effective jaundice treatment amount of the compound 1-phenyl-5,5-diethyl barbituric acid to the suffering animal.

2. The method according to claim 1 in which the compound is administered intravenously.

3. The method according to claim 1 in which the compound is administered orally.

4. The method according to claim 1 in which 1 mg./kg. to 40 mg./kg. animal body weight is administered daily.

References Cited

UNITED STATES PATENTS 2,955,073  10/1960  de Beer _____ 424—254

JEROME D. GOLDBERG, Primary Examiner